United States Patent [19]
Blaas et al.

[11] 3,984,653
[45] Oct. 5, 1976

[54] CAPACITOR-DISCHARGE STUD WELDING MACHINE

[75] Inventors: Karl Blaas, Buchs, Switzerland; Hans Hachtel, Vaduz; Dankmar Tauern, Triesenberg, both of Liechtenstein

[73] Assignee: Hilti Aktiengesellschaft, Schaan, Liechtenstein

[22] Filed: Sept. 6, 1974

[21] Appl. No.: 503,874

Related U.S. Application Data
[63] Continuation-in-part of Ser. No. 385,257, Aug. 3, 1973, abandoned.

[30] Foreign Application Priority Data
Aug. 7, 1972    Germany............................. 2238821

[52] U.S. Cl................................. 219/98; 219/136; 339/184 R
[51] Int. Cl.²......................................... B23K 9/20
[58] Field of Search ............ 174/115, 117 F, 117 R; 219/98, 136, 234; 333/1, 12; 339/31 M, 32 M, 32 R, 184 M, 184 R

[56] References Cited
UNITED STATES PATENTS

| | | | |
|---|---|---|---|
| 2,180,731 | 11/1939 | Dickinson | 174/117 R X |
| 2,487,582 | 11/1949 | Parris | 219/234 X |
| 3,098,178 | 7/1963 | Norden | 339/184 M X |
| 3,120,575 | 2/1964 | Hudson | 174/115 |
| 3,219,752 | 11/1965 | Harris | 174/117 R |
| 3,423,560 | 1/1969 | Brennen | 219/98 |
| 3,504,892 | 4/1970 | Crist | 174/117 R |
| 3,609,208 | 9/1971 | Winpisinger | 174/117 R X |

FOREIGN PATENTS OR APPLICATIONS

| | | | |
|---|---|---|---|
| 281,762 | 6/1927 | United Kingdom | 333/32 |

*Primary Examiner*—J. V. Truhe
*Assistant Examiner*—N. D. Herkamp
*Attorney, Agent, or Firm*—Toren, McGeady and Stanger

[57] ABSTRACT

In the machine disclosed, two flexible welding cables carry capacitor discharge current from a capacitor bank in a capacitor charging welding set and produce a movable electrical connection between a welding gun and a base material onto which a welding element is to be welded. Both welding cables are fixed with respect to one another. According to one embodiment of the invention the cables are arranged to be equidistant from one another substantially over their entire length. They are arranged as close as possible to each other within the breakdown limits of the insulation. The cables are of a predetermined length.

10 Claims, 11 Drawing Figures

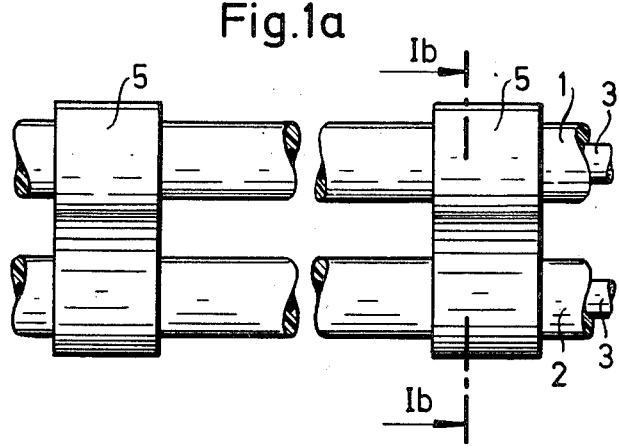
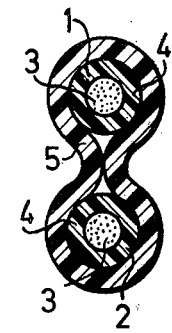
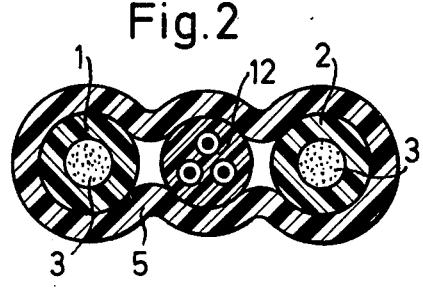
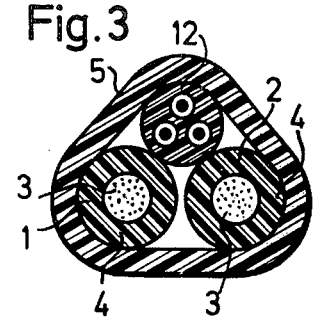
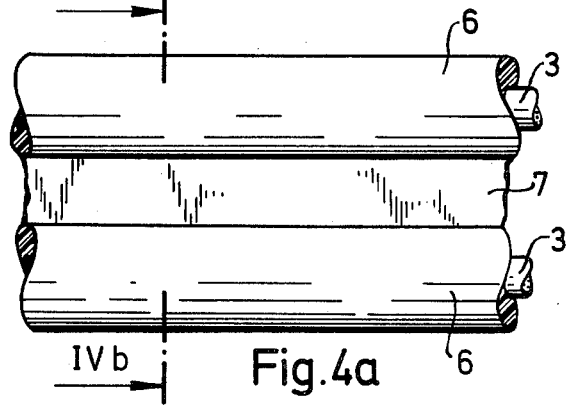
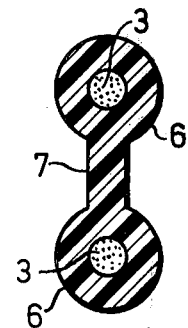

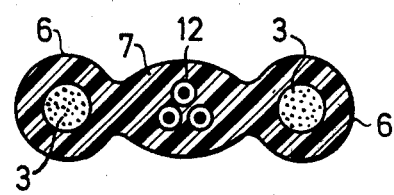
Fig.5
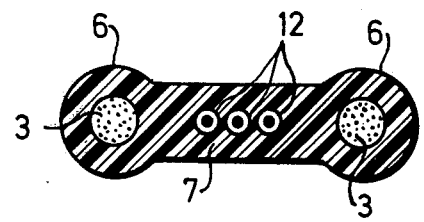
Fig.7     Fig.6
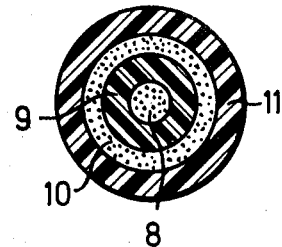
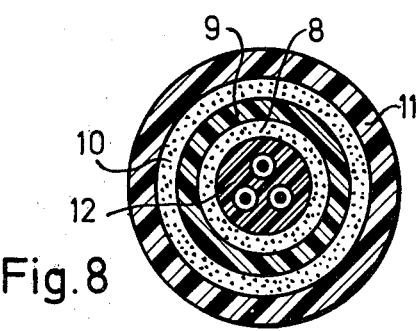
Fig.8

CAPACITOR-DISCHARGE STUD WELDING MACHINE

This application is a continuation-in-part application of my co-pending application, Ser. No. 385,257, Filing Date: Aug. 3, 1973, now abandoned, Title: CAPACITOR-DISCHARGE BOLT WELDING MACHINE.

BACKGROUND OF THE INVENTION

This invention relates to welding devices and particularly to capacitor discharge bolt or stud welding apparatuses.

Such apparatuses include a welding generator set, a welding gun, and at least two flexible current-carrying cables for establishing a movable electrical connection between the welding set and the welding gun, and between the welding set and the base metal onto which an element is to be welded by the welding gun.

As a rule, a capacitor bank in the welding set stores the electrical energy required for the welding operation. A current supply in the welding set recharges the capacitor from the line. A welding current switch starts the weld. If necessary, the apparatus also includes controls or regulating devices which usually form part of the set for adjusting the particular welding variables such as the voltage, welding time, the capacitance of the capacitor bank, and the like. The system may also include safety devices. In the welding gun, suitable means hold the element, such as a welding bolt or stud, etc., to be welded. A trigger or release switch in the gun permits closing of the welding current switch so as to actuate the welding operation.

Such capacitor-discharge welding operations generally involve a welding element having a forwardly extending tip, that is a thin projecting point, which serves to strike the arc. Thus, once the tip on the element makes contact with the base metal to which the element is to be welded, and the welding operation is initiated, the capacitor bank in the welding set discharges rapidly with a relatively steep current rise. This causes instantaneous melting and evaporation of the tip. An arc between the element and the base metal follows. The arc forms a weld pool in the base metal over the entire welding area. The gun then plunges the element into the weld pool. This plunging movement may be initiated before the welding switch is closed or at some time thereafter. When the available welding energy stored in the capacitor bank is discharged the weld pool cools and the stud or bolt remains welded in the weld metal. The actual welding time, that is the striking of the arc and the plunging of the welding element into the weld pool, lasts about 1 to 3 milliseconds.

In such systems the welding set is heavier and more unwieldy than the welding gun. Therefore, for assembly work using welding operations, the welding set is first installed at a convenient site. Then, the welding gun is connected with the welding set by means of flexible welding current cables and, if necessary, control cables. In this way it is possible to perform welding operations at scattered sites spaced at given distances from one another. An operator simply moves the welding gun along without having to move the welding set for each operation.

Hitherto, the flexible welding-current cables have taken the form of two individual lines independent of one another. It allows one of the cables to serve as a grounding connection for the base material onto which the elements are to be affixed by welding. Specifically, it allows the grounding connection to remain established at a given point on the base material as the welding gun is moved repeatedly in order to perform the individual welding operations. Moreover, lines having conductive crosssections as large as those required in the case of welding-current cables for stud welding machines are usually supplied by cable manufacturers as individual lines. Such individual lines permit maximum freedom of movement with the welding gun. This practice also follows the usual arc welding procedure which uses individual lines.

While such capacitor discharge welding apparatuses are suitable for many purposes, they produce welds which vary undesirably when used in assembly procedures where a gun is moved from one position to another.

Suggestions have been made for overcoming this problem by issuing special instructions to the operators for compensating for shifts in positions or by having the operators interconnect compensating circuits for different positions.

Such instructions are often not followed so that the problem of non-uniform welds remains. Automatic compensating devices would be cumbersome and costly.

An object of the present invention is to improve welding devices.

Another object of the invention is to overcome these problems.

SUMMARY OF THE INVENTION

According to a feature of the invention, these objects are obtained, in whole or in part, by substantially defining a predetermined geometrical relationship between the two welding-current cables.

According to another embodiment of the invention, the conductors of the two welding current cables are spaced substantially equidistant from one another over their entire length.

According to another embodiment of the invention the conductors form parallel lines.

According to another embodiment of the invention the conductors form coaxial lines.

According to another embodiment of the invention the conductors form braced conductors.

According to another embodiment of the invention the cables are connected by tape, clamps, or the like.

According to another embodiment of the invention the conductors of the cables are arranged as close as possible to each other consistent with adequate insulation between each other.

In accordance with another embodiment of the invention the stud welding machine is provided with additional inductance to overcome the effect of excessive drops in the discharge-current cable as a result of their tight bundling or close proximity.

According to another embodiment of the invention the conductors forming the twin line units have the same length. Preferably, their crosssections are enlarged so as to reduce their Ohmic resistances for identical cable lengths.

According to another feature of the invention, a specific compensating circuit is connected with each pair of cables having a specific length. However, in order to relieve the operator of the need to adjust the compensating value to specific cable lengths, the conductors of specific cable lengths are provided with special cable plugs that adjust the compensating circuits when inserted in cable junction sockets. The different plugs for different lengths adjust the adaptor circuits. Alternately, the plugs representing different lengths are capable of engaging only junction sockets connected to adaptor circuits that correspond to these lengths. The system is thus automatically adjusted to compensate for each set of conductor lengths at the cable junction sockets the moment the plugs are plugged into the cable junction sockets of the bolt welding set. This reliably eliminates improper compensation.

According to another feature of the invention, a control lead is combined with two welding-current leads to form a single cable. The control lead makes it possible to transmit control signals between the welding gun and the welding set. Such control signals may for example be in the form of a triggering signal from a trigger switch in the welding gun to a welding current switch in the welding set. By combining the control lead with the welding current conductors, it is possible to achieve a neat and readily inspectable cable arrangement.

These and other features of the invention are pointed out in the claims. Other objects and advantages of the invention will be evident from the following detailed description when read in the light of the accompanying drawings:

BRIEF DESCRIPTION OF THE DRAWINGS

FIGS. 1a and 1b respectively illustrate a top and crosssectional view of a welding current cable arrangement composed of two individual welding current cables interconnected by junction members, and embodying features of the invention;

FIGS. 2 and 3 are crosssections of a cable arrangement embodying features of the invention, similar to the embodiment illustrated in FIGS. 1a and 1b, where a multi-conductor control cable is combined with the welding current cables.

FIGS. 4a and 4b are top and sectional views of another cable arrangement embodying features of the invention wherein a web extending over the length of the cables interconnects the cables so as to form a single continuous cable;

FIGS. 5 and 6 are crosssectional views illustrating another cable arrangement embodying features of the invention similar to that illustrated in FIGS. 4a and 4b wherein the web embraces the multiplicity of conductors and the whole system forms an individual cable;

FIG. 7 is a crosssection of a coaxial welding-current cable embodying features of the invention;

FIG. 8 is a crosssection illustrating a coaxial welding current cable embodying features of the invention; similar to the embodiment illustrated in FIG. 7 and including a multi-conductor cable as its center.

DETAILED DESCRIPTION OF PREFERRED EMBODIMENTS

Figure 9:
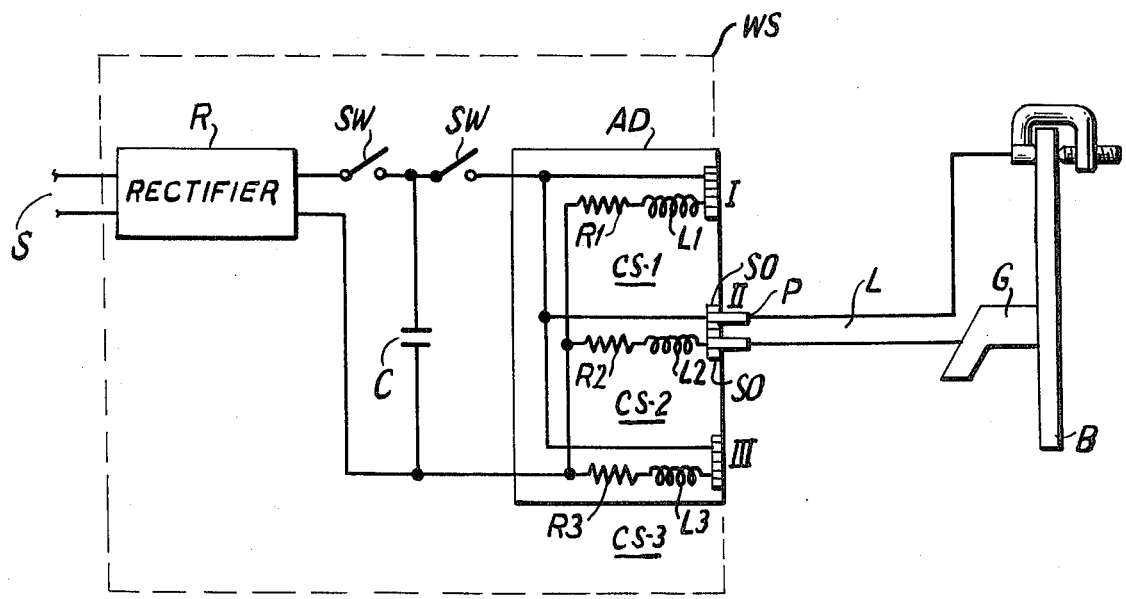
FIG. 9 is a circuit diagram of a system embodying features of the invention.

In FIGS. 1a and 1b, two welding current cables 1 and 2, each includes a stranded metal conductor 3 surrounded by a sheath of insulating material 4. Plastic clamps 5 grasp the cables 1 and 2 at short intervals. The resulting welding line has particularly high flexibility and can be handled especially well in assembly operation where this flexibility is a major factor.

In FIG. 2, a control cable 12 is provided between the two welding-current cables 1 and 2. The control cable 12 includes a plurality of conductors that serve for transmission of control signals between the welding gun and the welding machine. Plastic clamps 5 maintain the geometric relationship between the cables 1,2, and 12.

In FIG. 3, the two welding cables 1 and 2 and the control cable 12, viewed crosssectionally, are arranged so that they are of substantially triangular shape. This can be seen from FIG. 3.

FIGS. 4a and 4b illustrate a welding current line in which a web 7 of insulating material supports two welding current cables relative to each other over their entire lengths. In FIGS. 4a and 4b, the cables are composed of two stranded metal wires 3 covered by insulating material 6. The latter is composed of plastic or rubber and extends between the two cables in the area of the web 7. According to an embodiment of the invention discontinuities in the web 7 along the welding current line improve the welding current line.

The lines of FIGS. 5 and 6 are similar to the line illustrated in FIGS. 4a and 4b. However here, a three-conductor control cable 12 is embedded longitudinally in each web 7 and therefore combined with the two welding current cables.

In FIG. 7, a welding current line is in the form of a coaxial cable. A core wire 8 is in the form of braided metallic wire surrounded by insulation 9. A conductor 10 of identical conductor crosssection as the conductor 8 surrounds the insulator 9. Another insulation 11, surrounding the conductor 10 forms a protective sheath. According to another embodiment of the invention a separate protective jacket surrounds the sheath 11.

In FIG. 8, a three-conductor control cable 12 fits inside the core conductor 8 which is now in the form of a cylindrical conductor.

FIG. 9 is a circuit diagram of a system embodying features of the invention. Here, a welding set WS energized from a source S cooperates with a hand-held gun G that welds suitable welding elements, such as studs or bolts, onto a base material B through a multi-conductor composite line or cable L. The line L is composed of any one of the lines illustrated in FIGS. 1a through 8. It carries the welding current from the welding set WS to the gun G and back. One of the conductors in the line L is connected to the base material B. Where control conductors are a part of the line, these carry control signals back to the welding set WS. The welding set WS is composed generally of a rectifier R, a capacitor bank C, and suitable switches SW which may be remotely operated from places such as a trigger in the gun. In the line L the conductors have predetermined lengths. To change the lengths, a different line is used. The crosssections of the conductors and the spacing between conductors of any line is selected to conform the resistance and inductance of the line to the length to obtain optimum inductance and resistance.

In FIG. 9 the welding set includes an adaptor AD. In the adaptor suitable sockets I, II, and III receive plugs that project from the line L. The size of the plugs P are indicative of the lengths of the conductors in the line L. The adaptor AD responds to the sizes of the plugs with compensating circuits CS-1, CS-2, and CS-3 interposed between the capacitor bank C and the line L. The circuit CS1 is composed of series resistor R1 and inductor L1, CS2 of series resistor R2 and inductor L2, CS3 of series resistor R3 and inductor L3. The values of the resistors R1, R2, and R3 and inductors L1, L2, and L3 are such as to overcome the effect of excessive drops in the particular discharge current cables as a result of close proximity of the conductors.

According to another embodiment of the invention different size sockets SO each receive only the plugs P of a particular size. When the sockets and plugs of corresponding size are engaged the circuit within the adaptor AD is correct for the length of the conductors in the line L.

For a line L such as that shown in FIG. 1b, where the conductors 3 and 3 are made of stranded wire with 7 millimeters in diameter and an effective cross-section of 25 square millimeters, the conductors being 15 millimeters spaced from each other and both 4 meters long (i.e. a total wire-length of 8 meters), the resistance and inductance values are 6 milliohms and 2 microhenrys. For such a line, representative values for the resistor R1 and the inductor L1 are 14 milliohms and 5 microhenrys. For the same type of cable but 6 (total 12) meters long, representative values for the resistor R2 and the inductor L2 and 11 milliohms and 4 microhenrys. Representative values for the resistor R3 and the inductor L3 are 8 milliohms and 3 microhenrys, 2 for the same type of cable but 8 (total 16) meters long.

The embodiments of the invention take into consideration the recognition that in capacitor stud welding apparatuses both the length and conductive cross-section of the welding cables, as well as their particular arrangement and path, exert a considerable influence on the result of the welding operation. The length and conductive crosssection of the current cables determines their Ohmic resistance. The inductance of the welding-current cables depends on their distance from one another and whether they follow paths which are linear or in loops. The invention is based on the recognition that, if the Ohmic resistance and the inductance of the welding-current cables both differ depending on the choice of their length and their conductive crossections, the pulse-like welding currents also differ. This results in welds which may be unsatisfactory.

The invention avoids these problems by combining lines having conductors of predetermined length and predetermined geometric arrangement with a particular welding set or a particular compensating circuit with a welding set. Thus, for any group of operations using the same welding cables the set and the conductors produce the same current pulse. The aforementioned problems are not critical in ordinary arc welding because there the welding current rises and falls in a substantially flatter curve than in the case of capacitor discharge welding. The arrangement of the welding-current cables, their length, and the conductive cross-section does not significantly affect the welding result in ordinary arc welding.

The invention also takes into consideration that with capacitor discharge welding, the actual welding time, that is the time for the striking of the arc and the plunging of the weld element into the weld pool, lasts only 1 to 3 milliseconds, and that this time is significant. It recognizes that at the onset of the welding operation a relatively steep current rise is required to cause instantaneous melting and evaporation of the tip projecting from the front end of the element to be welded. During the arcing time a sufficiently high current density is required to extend the weld pool over the entire welding area. Because the available welding energy stored in a capacitor bank is limited and relatively low, and an increase in energy entails substantial cost, the energy must be optimally used. Thus it is not possible to forsake a portion of the energy in order to compensate for various changes in parameters. The invention avoids problems arising from these facts.

The invention is further based upon the recognition that the configuration of the current pulse of the welding current, even if the power supply is uniform, can greatly affect the quality of the weld. An extension of the time of the pulse results in inadequate utilization of the energy made available by the capacitor bank and, therefore, an inadequate weld pool. On the other hand shortening of the pulse may result in the welding element being plunged into already solidified metal. Both of these instances would produce unsatisfactory results. The invention avoids these problems.

The invention involves recognizing that the configuration of the welding current pulse is determined by the capacity of the capacitor bank, its charging voltage, the inductance of the overall welding circuit, and the resistance of the overall welding circuit. The invention overcomes the fact that the capacitance of the capacitor bank and its charging voltage have hitherto belonged to the traditional setting parameters in capacitor discharge stud welding operations and that the inductance and resistance parameters of the overall welding circuit have hitherto been left to the discretion of the operator who arranges the welding current cables in different ways. Where the welding current path is ten meters, the inductance of the overall welding circuit can be modified by a factor of nearly two by arranging the conductors of the welding current cables in parallel on the one hand or forming a circle on the other.

Known capacitor discharge stud welding apparatuses utilize adjustment devices for partly obviating the aforementioned defects. These devices adjust the individual parameters affecting the welding operation to compensate for the variable influences generated by the welding cables. The attending disadvantage is that it is quite difficult for the user to assess these influences in advance and he is therefore barely able adequately to compensate for them. Besides there is the risk that the user will forget to make any such compensation. Some known bolt welding machines are delivered with operating instructions recommending aligning the welding current cables as much as possible and to avoid loops in the line. To the extent that the user follows these instructions at all, the operating and handling of the capacitor discharge stud welding machine becomes more complex. With some capacitor discharge stud welding machines attempts are made to keep the variable effects generated by the welding current cables at a negligible level by incorporating a relatively high line resistance in the welding circuits. As a result, the operator substantially reduces the effects brought about by differences in the geometric arrangement of the welding current cables. The disadvantage of this known compensation process is increased power consumption and a built-in undesirable effect produced by the invariable high inductance and the invariable high circuit resistance. The invention recognizes these problems and avoids them.

Tests have been performed which show that, as a result of varying the length and layout of welding current cables it is possible to modify the welding conditions from good to unutilizable. The invention avoids these problems and compensates for them. The greater the length of the current cable, the more intense are the aforementioned influences.

As can be seen the invention not only takes these problems into consideration and is based upon the recognition of these facts but, at least partly, and in most cases wholly, obviates these problems.

As a result of the invention the welding-current cables have predetermined conductive parameters, inductive and resistive, that can be taken into account immediately upon adjusting the stud welding machine. Welding current cables can be arranged in loops or in any other arbitrary manner without modifying their conductivity parameters in the process. In this way it is possible to prevent welding parameters from being modified by the operator's placement of the cables. As a result, the operator need no longer pay attention to the cable arrangement for placement. This facilitates cable handling.

The conductivity parameters of the welding cables can therefore be maintained as constant as possible, and the parameters of the welding circuit can be selected optimally to achieve the most favorable pulse configuration for the welding current pulse. By placing the welding current conductors substantially equal distance from one another over their entire length, the possible effects of iron substances situated in the proximity of the welding-current cables is eliminated. Moreover, the effects of arranging the cables in loops or coiling of the welding current cables is substantially insignificant in view of the fact that the magnetic fields are balanced out in the supply and return flow of welding current.

According to the invention, the cable units exhibit predetermined lengths and the cross-sections of the conductors are selected to be larger than hitherto used in order to keep the overall inductance and resistance of the welding circuit roughly the same as previous systems.

To maintain the inductance at a desirable level, it is possible to use a line in which the conductors are more closely spaced than in previous systems. It is, of course, understood that with each cable unit of predetermined length, its conductor cross-section, as well as their arrangement with respect to one another, are optimally selected with respect to their length.

While embodiments of the invention have been described in detail it will be obvious to those skilled in the art that the invention may be embodied otherwise without departing from its spirit and scope.

We claim:

1. A capacitor-discharge stud welding apparatus for welding a welding element on to a base material, comprising capacitor-discharge welding energy means for storing energy to be used while welding, a welding gun, connector means connecting said welding gun to said energy means, said connector means including two flexible welding current cables each having a conductor and an insulator sufficient to carry the welding current and each being sufficiently flexible to establish a movable connection between the gun and the energy means so that the welding gun can be moved relative to the base material, said welding current cables being substantially fixed relative to one another over a portion of their lengths with respect to at least one geometric parameter, said energy means including a capacitor bank and adaptor means for coupling the output of said capacitor bank to the conductors of said connector means characterized in that; said adaptor means is provided with a plurality of different size sockets so as to receive connector means of a related size where each size corresponds to a cable of specified length, and further characterized in that said adaptor means includes compensating circuits whose inductance and resistance are related to the length of the conductors in said connector means.

2. An apparatus as in claim 1, wherein said cables have their respective conductors equal distance from one another substantially over their entire lengths.

3. An apparatus as in claim 2, wherein said conductors of said cables are as close to one another as permissible by the required insulation.

4. An apparatus as in claim 1, wherein said connector means includes a control conductor for carrying control signals between said welding gun and said energy means.

5. An apparatus as in claim 1, wherein said conductors in said connector means are coaxial.

6. An apparatus as in claim 1, wherein said conductors in said connector means are parallel to one another, and wherein said connector means include a control conductor between said welding gun and said energy means, said control conductor being located between said conductors for carrying welding current.

7. An apparatus as in claim 1, wherein said conductors are parallel and wherein said connector means includes a control conductor parallel with said welding-current carrying conductors, said three conductors being arranged in a substantially triangular relationship.

8. An apparatus as in claim 1, wherein means in said connector means space said cables from each other, said means being composed of discontinuous spacers.

9. An apparatus as in claim 1, wherein said conductors in said connector means are spaced from one another by a continuous web.

10. Apparatus according to claim 1 wherein a different compensating circuit is connected between different size sockets and said capacitor bank.

* * * * *